United States Patent
Clayton et al.

(10) Patent No.: US 12,537,094 B2
(45) Date of Patent: Jan. 27, 2026

(54) SYSTEMS AND METHODS FOR AUTOMATED REFERRAL WITH CONCURRENT INFORMATION TRANSMISSION

(71) Applicant: A Place for Mom, Inc., New York, NY (US)

(72) Inventors: Scott Matthew Clayton, Zionsville, IN (US); Danielle Stoppelmann, New York, NY (US); Steven Feero, Cheshire, CT (US); Neil Vora, Houston, TX (US)

(73) Assignee: A Place for Mom, Inc., New York, NY (US)

( * ) Notice: Subject to any disclaimer, the term of this patent is extended or adjusted under 35 U.S.C. 154(b) by 14 days.

(21) Appl. No.: 18/775,703

(22) Filed: Jul. 17, 2024

(65) Prior Publication Data

US 2026/0024652 A1    Jan. 22, 2026

(51) Int. Cl.
*G06F 16/9538*    (2019.01)
*G16H 40/20*    (2018.01)
*H04L 9/40*    (2022.01)

(52) U.S. Cl.
CPC ......... *G16H 40/20* (2018.01); *G06F 16/9538* (2019.01); *H04L 63/08* (2013.01)

(58) Field of Classification Search
None
See application file for complete search history.

(56) References Cited

U.S. PATENT DOCUMENTS

| | | | |
|---|---|---|---|
| 11,978,563 B1 | 5/2024 | Wong et al. | |
| 2007/0136091 A1* | 6/2007 | McTaggart | G16H 40/20 705/2 |

(Continued)

FOREIGN PATENT DOCUMENTS

AU    2012328895 A1 *    4/2014    ........... G06F 16/248

OTHER PUBLICATIONS

"U.S. Appl. No. 18/787,403, Non Final Office Action mailed Sep. 26, 2024", 12 pgs.

*Primary Examiner* — Raqiul A Choudhury
(74) *Attorney, Agent, or Firm* — Schwegman Lundberg & Woessner, P.A.

(57) ABSTRACT

Disclosed, is an automated referral system for generating and managing referrals for services or products. According to certain examples, the system operates by receiving user-defined criteria from a client device, such as location, budget, and service type. It filters a database to identify a relevant subset of search results, which are then evaluated against a dynamically adjusted threshold to ensure relevance and adequacy. A referral request is generated based on the user criteria and the identified subset. The system ensures security through robust user authentication, potentially including two-factor authentication, before displaying the search results on the user's device and securely transmitting the referral request to appropriate recipients. The referral requests are encrypted for security. The system's dynamic adjustment of the threshold based on contextual factors and its capability to handle iterative user inputs for refining search criteria significantly enhance the user experience and the precision of the referral process.

20 Claims, 11 Drawing Sheets

(56) References Cited

U.S. PATENT DOCUMENTS

| | | | |
|---|---|---|---|
| 2007/0208745 A1* | 9/2007 | Ture | G06F 21/6227 707/999.009 |
| 2010/0153133 A1* | 6/2010 | Angell | G16H 50/50 706/46 |
| 2015/0310105 A1* | 10/2015 | Brew | G06F 16/2477 707/706 |
| 2018/0106638 A1 | 4/2018 | Nallu et al. | |
| 2020/0327175 A1* | 10/2020 | Stephenson | G06F 16/90335 |
| 2021/0290056 A1 | 9/2021 | Karandikar et al. | |
| 2023/0317221 A1 | 10/2023 | Blechman | |

* cited by examiner

500

CAUSING DISPLAY OF A REQUEST TO DEFINE A SECOND CRITERIA BASED ON THE COMPARISON OF THE QUANTITY OF SEARCH RESULTS AGAINST THE THRESHOLD VALUE AND THE USER INPUT THAT DEFINES THE CRITERIA
502

RECEIVING A SECOND USER INPUT THAT DEFINES THE SECOND CRITERIA
504

FILTERING THE SUBSET OF THE SET OF SEARCH RESULTS BASED ON THE CRITERIA AND THE SECOND CRITERIA
506

FIG. 5

SYSTEMS AND METHODS FOR AUTOMATED REFERRAL WITH CONCURRENT INFORMATION TRANSMISSION

TECHNICAL FIELD

Embodiments of the present disclosure relate generally to the field of information technology, including systems and methods designed to automate workflows and data transmission processes. More specifically it pertains to systems and methods for the automation and improvement of referral processes, applicable across diverse sectors including healthcare, legal, and business services.

BACKGROUND

The present invention relates to the field of healthcare information technology, specifically to systems and methods for automating referral processes.

In the healthcare industry, the referral process is essential for coordinating patient care, enabling primary care providers and individuals to direct patients to specialists or other healthcare services. Traditionally, this process involves manual handling of referral forms, patient records, and other relevant information, often leading to delays and errors. Existing electronic health record (EHR) systems offer some level of automation; however, they frequently lack the capability for real-time, concurrent information transmission between multiple entities.

Current referral systems typically require manual entry of patient data, verification, and transmission to the receiving entity, which can be time-consuming and prone to human error. Moreover, these systems often fail to provide seamless integration with various healthcare providers' systems, resulting in fragmented and incomplete patient information.

Despite advancements in EHR technologies, significant challenges remain. Manual processes lead to inefficiencies and increase the risk of data entry errors, which can adversely affect patient care. The lack of concurrent information transmission capabilities results in delays in the referral process, as information is not immediately available to the receiving party. Additionally, interoperability issues between different EHR systems hinder the smooth exchange of patient data, further complicating the referral process.

There is a substantial need for a solution that addresses these inefficiencies by providing a robust, automated system capable of executing referral processes. Such a system would significantly enhance operational efficiency, reduce errors, and improve overall service quality across various industries, thereby meeting the critical demand for more streamlined, effective workflow management solutions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart depicting a method illustrating various operations of the automated referral system in determining a set of search results, according to certain examples.

DETAILED DESCRIPTION

Figure 1:
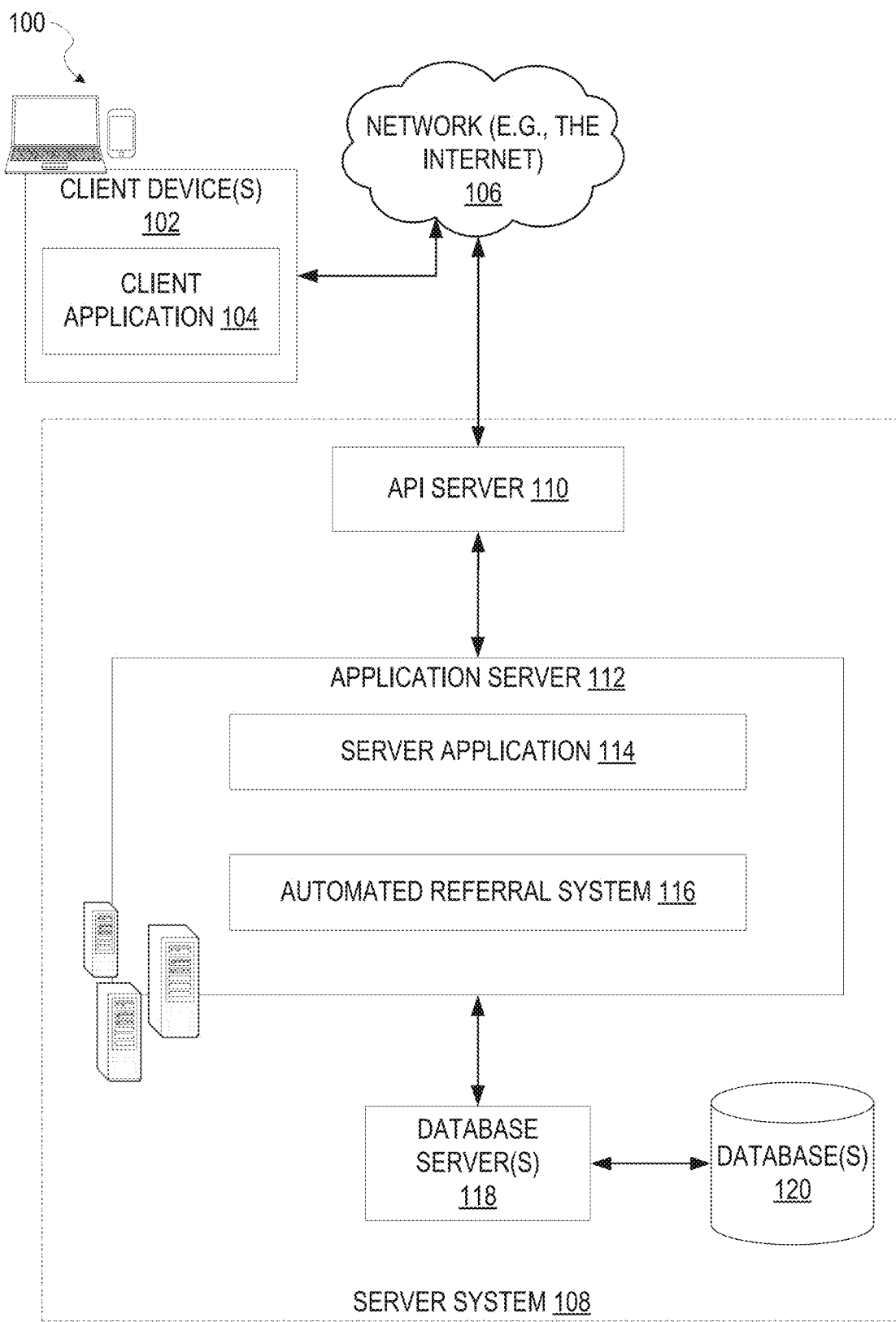
FIG. 1 is a block diagram showing an example system for exchanging data (e.g., messages and associated content) over a network in accordance with some examples, wherein the system includes an automated referral system.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

The disclosed subject matter pertains to an automated referral system designed to enhance the efficiency and accuracy of service or product referrals through a digital platform. This innovative system integrates a series of specialized modules and processes that work in concert to streamline the referral process. These include modules for capturing user inputs, filtering search results based on user-defined criteria, dynamically adjusting thresholds for evaluating these results, and securely managing referral requests. The system is particularly advantageous in sectors where quick and reliable access to specific services or products is essential, such as healthcare, real estate, or consumer services.

The automated referral system addresses significant inefficiencies and reliability issues inherent in traditional referral systems, which typically require manual interventions and are susceptible to errors and delays. Traditional methods often fail to dynamically adjust to the diverse and changing needs of users and do not ensure the secure transmission of sensitive information. The automated referral system resolves these issues by offering a fully digital solution that not only automates the referral process but also incorporates dynamic adjustments for optimizing result relevance and robust authentication mechanisms to safeguard user data.

An example of the system's application can be seen in a healthcare setting where a user may need to find care providers (e.g., senior living communities, specialists, etc.) within a specific geographic area who accept certain types of insurance. The user inputs these criteria, and the system filters care providers accordingly, assesses the adequacy of the resulting matches against a dynamic threshold, and, following user authentication, sends referral requests to the selected providers. This streamlined process enhances the accuracy and speed of making referrals.

According to certain examples, the automated referral system operates through a process of generating and managing referral requests based on user-defined criteria. This method begins when a user from a client device inputs specific criteria via various interfaces presented at a client device. The criteria may include location data, budgetary constraints, and the type of service required. The system then filters a database to identify a subset of search results that match these criteria, assessing the quantity of these results against a dynamically adjusted threshold value. In some examples, the threshold is not static and may be adjusted based on contextual factors related to the user's input, such as the specificity of the location or the budget range.

Once the system determines that the quantity of search results meets the threshold criteria, it generates a referral request. This request is based on both the user's criteria and the identified subset of search results. To ensure security and user authenticity, the system performs a user authentication process, which may include robust methods like two-factor authentication.

Following authentication, the system simultaneously displays the subset of search results on the user's client device, and securely transmits the referral request to one or more recipients who correspond to the subset of search results.

Additionally, the system is designed to handle complex user interactions. If the initial search results are insufficient, the system prompts the user to refine their criteria. It displays a request for the user to define a second set of user criteria based on the initial results and the threshold comparison. After receiving this second user input, the system performs another round of filtering, considering both the first and second sets of criteria to fine-tune the search results further.

FIG. 1 is a block diagram depicting a system 100 for exchanging data (e.g., messages, user criteria, and associated content) over a network 106. The system 100 includes one or more client devices 102, each of which hosts applications including a client application 104. Each client application 104 may be communicatively coupled to other instances of the client application 104 and a server system 108 via the network 106 (e.g., the Internet).

Accordingly, each client application 104 is able to communicate and exchange data with another client application 104 and with the server system 108 via the network 106. The data exchanged between client applications 104, and between a client application 104 and the messaging server system 108, includes functions (e.g., commands to invoke functions) as well as payload data (e.g., text, audio, video or other multimedia data, user inputs and selections).

The server system 108 provides server-side functionality via the network 106 to a particular client application 104. While certain functions of the system 100 are described herein as being performed by either a client application 104 or by the server system 108, it will be appreciated that the location of certain functionality either within the client application 104 or the server system 108 is a design choice. For example, it may be technically preferable to initially deploy certain technology and functionality within the server system 108, but to later migrate this technology and functionality to the client application 104 where a client device 102 has sufficient processing capacity.

The server system 108 supports various services and operations that are provided to the client application 104. Such operations include transmitting data to, receiving data from, and processing data generated by the client application 104. In some embodiments, this data includes, message content, client device information, geolocation information, user input data, and message content persistence conditions, as examples. In other embodiments, other data is used. Data exchanges within the system 100 are invoked and controlled through functions available via user interfaces (UIs) of the client application 104.

Turning now specifically to the server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server receives and transmits data (e.g., commands and message payloads) between the client device 102 and the application server 112. Specifically, the Application Program Interface (API) server 110 provides a set of interfaces (e.g., routines and protocols) that can be called or queried by the client application 104 in order to invoke functionality of the application server 112. The Application Program Interface (API) server 110 exposes various functions supported by the application server 112, including account registration, login functionality, the sending of messages, via the application server 112, from a particular client application 104 to another client application 104, the sending of media files (e.g., images, videos, text documents or other document files) from a client application 104 to the server application 114, and for possible access by another client application 104, the retrieval of messages and content, opening and application event (e.g., relating to the client application 104).

The application server 112 hosts a number of applications and subsystems, including a server application 114, and an automated referral system 116. Additional details regarding the automated referral system 116 are provided in FIG. 2. The server application 114 implements a number of message and input processing technologies and functions, particularly related to the aggregation and other processing of content (e.g., textual and multimedia content) included in messages and inputs received from multiple instances of the client application 104. As will be described in further detail, the text and media content from multiple sources may be aggregated into collections of content (e.g., to be presented as search results and recommendations). These collections are then made available, by the server application 114, to the client application 104. Other processor and memory intensive processing of data may also be performed server-side by the server application 114, in view of the hardware requirements for such processing.

The application server 112 is communicatively coupled to one or more database server(s) 118, which facilitates access to a database(s) 120 in which is stored data associated with messages and inputs processed by the server application 114.

Figure 2:
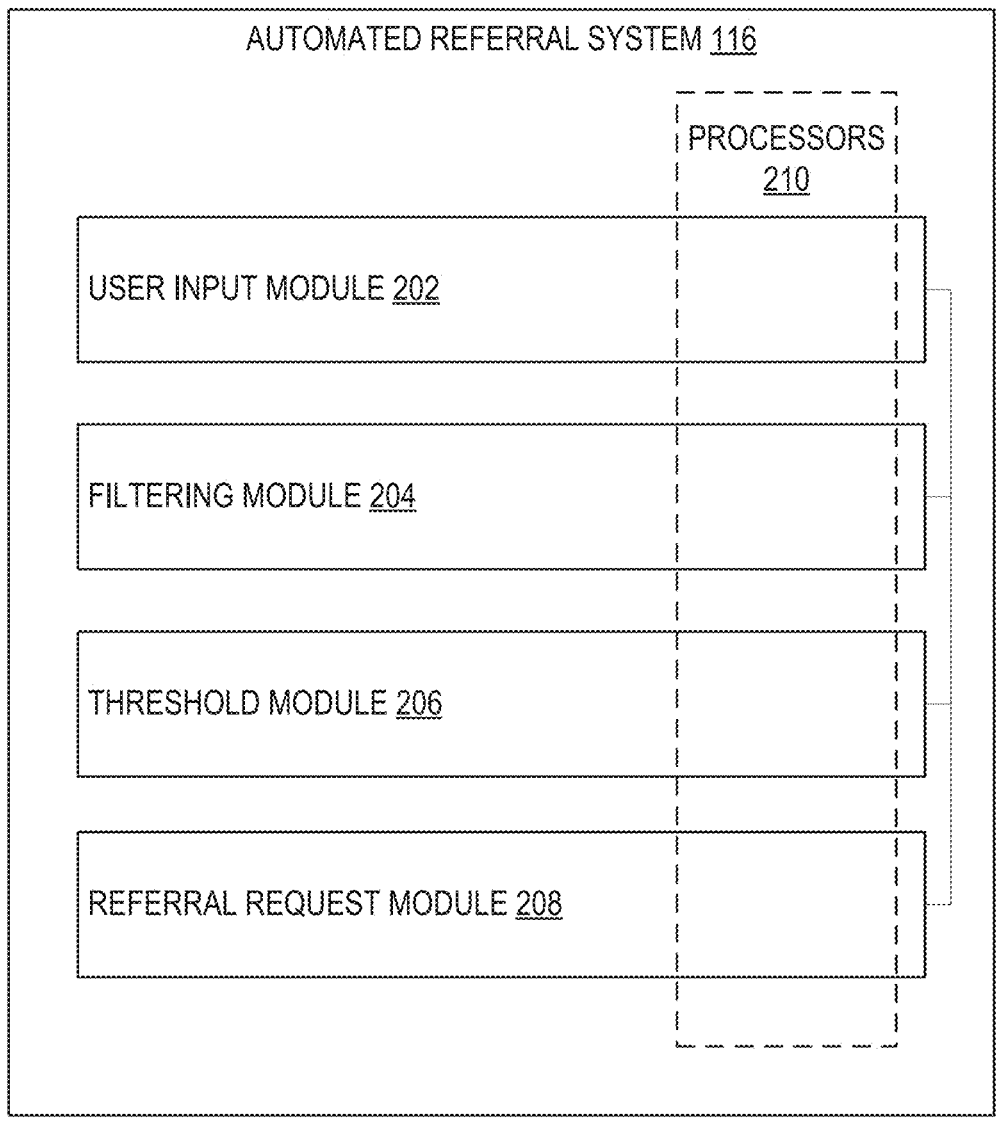
FIG. 2 is a block diagram illustrating further details regarding an automated referral system, according to examples.

FIG. 2 is a block diagram 200 illustrating components of the automated referral system 116, that configure the automated referral system 116 to receive user input via a GUI presented at a client device 102, filter search results based on criteria defined by the user input, compare attributes of these results against a dynamic threshold, and authenticate users for the simultaneous display and transmission of results and referrals.

According to certain examples, the automated referral system 116 is shown as including a user input module 202, a filtering module 204, a threshold module 206, and a referral request module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the automated referral system 116 may physically include an arrangement of one or more of the processors 210 (e.g., a subset of or among the one or more processors of the machine) configured to perform the operations described herein for that module. As another example, any module of the automated referral system 116 may include software, hardware, or both, that configure an arrangement of one or more processors 210 (e.g., among the one or more processors of the machine) to perform the operations described herein for that module. Accordingly, different modules of the automated referral system 116 may include and configure different arrangements of such processors 210 or a single arrangement of such processors 210 at different points in time. Moreover, any two or more modules of the automated referral system 116 may be combined into a single module, and the functions described herein for a single module may be subdivided among multiple modules. Furthermore, according to various example embodiments, modules described herein as being implemented within a single machine, database, or device may be distributed across multiple machines, databases, or devices.

According to certain examples, the user input module 202 serves as the gateway through which user interactions with the system 100 may begin. In certain examples, the user input module 202 is configured to interface directly with client devices 102, such as smartphones or computers, to capture specific criteria defined by the users via GUI presented by the automated referral system 116 at the client devices 102. For example, as will be discussed further below these criteria could range from simple data inputs like geographical preferences to more complex filters such as budget constraints or service requirements. The module ensures that the user's requirements are accurately captured and relayed to subsequent system components for further processing, establishing the foundation for a tailored search and referral process.

According to certain examples, the filtering module 204 takes the user-defined criteria from the user input module 202 and applies these parameters to search through a comprehensive database. As an illustrative example, if a user specifies a need for care services (e.g., senior living centers) within a specific area, or within specified budgetary constraints, the filtering module 204 filters out all unrelated entries from within the database 120, focusing only on relevant service providers in the designated location.

According to certain examples, the comparison module 206 compares a quantity of the filtered results against a dynamically determined threshold value to determine if the results are sufficient to proceed with referral and display. For example, if the number of results is too low, indicating a lack of options, the system may prompt for broader criteria or additional inputs. Conversely, a high volume of results might trigger further refinement to ensure the most suitable matches are presented. This module ensures that the system maintains a balance between quantity and quality, optimizing the referral process.

In some examples, the comparison module 206 may dynamically determine the threshold value for comparison based on one or more contextual factors. For example, the comparison module 206 may dynamically determine the threshold value for comparing the quantity of search results using contextual information by analyzing historical data of related or similar users. Similarity may be determined based on factors including but not limited to a user specified care type required, a user specified location, or other user-specified criteria.

Accordingly, the comparison module 206 may analyze the contextual factors such as the complexity and specificity of the search query, as more specific queries might yield fewer results, whereas broad queries might yield many results. Additionally, the current context, including the device being used (e.g., mobile vs. desktop), the time of day, and the user's location, may play a role.

In some examples, the comparison module 206 may calculate the threshold via adaptive algorithms and machine learning models. For example, these models adjust the threshold based on real-time analysis of the contextual factors. In some examples, relevance scoring may be utilized, where the comparison module 206 assigns scores to search results based on their relevance to the query and dynamically adjusts the threshold to include only highly relevant results if the total number is too high.

According to certain examples, the comparison module 206 may apply a feedback loop, wherein the system continuously gathers data on how users interact with the presented results. Adjustments to the dynamic threshold are made based on whether users engage with the results, such as clicking, scrolling, or spending time on the page. Various dynamic adjustment strategies can be used, including heuristic rules and statistical methods, to determine a cutoff point where the probability of relevance drops significantly.

In some examples, the referral request module 208 is responsible for the generation and management of the referral process. For example, once the subset of search results is deemed appropriate by the comparison module 204, the referral request module 208 generates a detailed referral request that includes not only the user criteria but also the selected options and authenticated user data. The referral request module 208 may manage the authentication of the user to ensure data integrity and provide additional security. Accordingly, the referral request module 208 may simultaneously display the refined search results at the client device 102 of the user while concurrently transmitting the referral request to the selected service providers or relevant recipients.

Figure 3:
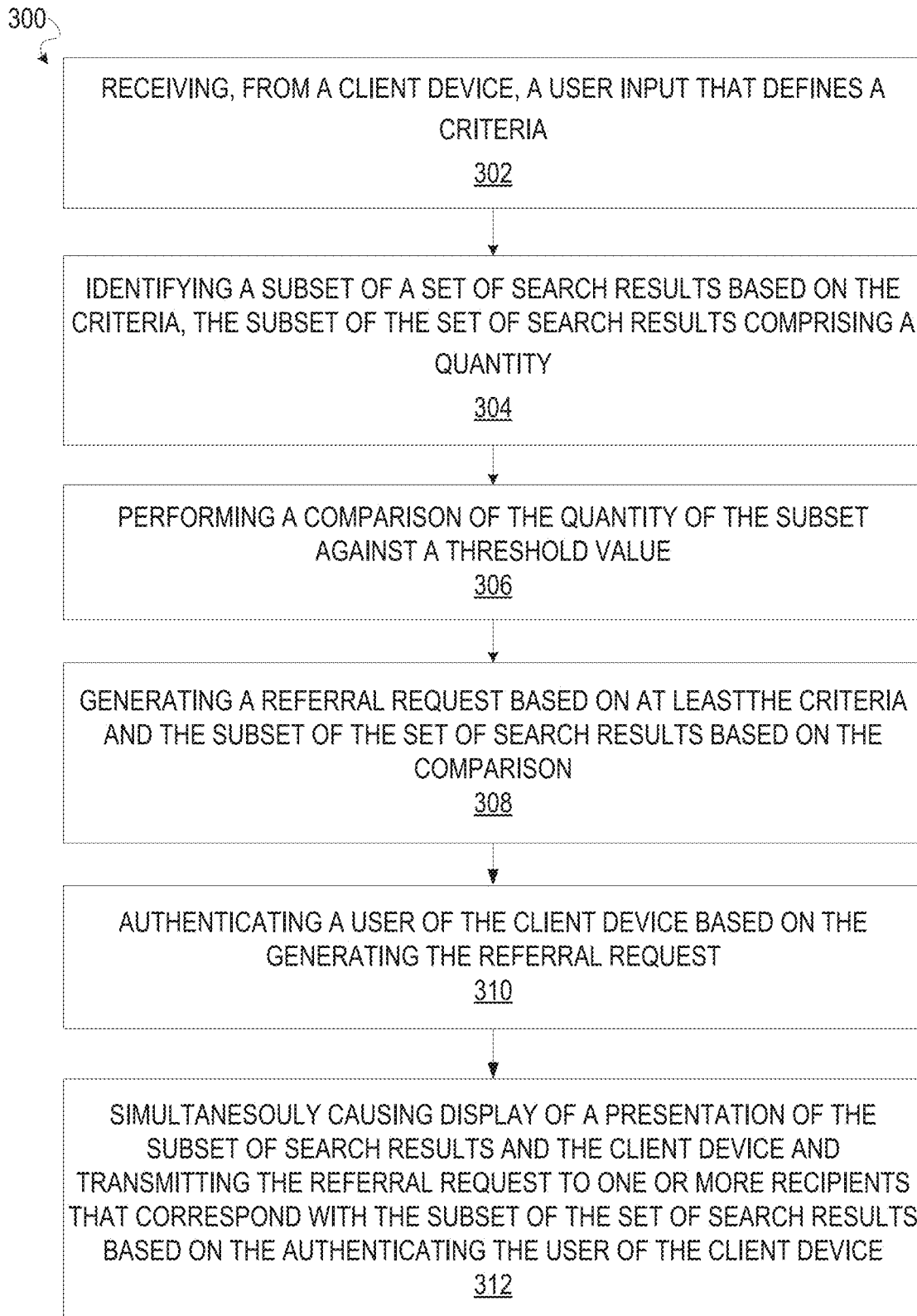
FIG. 3 is a flowchart depicting a method illustrating various operations of the automated referral system in presenting a set of search results while concurrently transmitting a referral request, according to certain examples.

FIG. 3 is a flowchart depicting a method 300 illustrating various operations of the automated referral system 116 in presenting a set of search results while concurrently transmitting a referral request, according to certain examples. Operations of the method 300 may be performed by the modules described above with respect to FIG. 2. As shown in FIG. 3, the method 300 includes one or more operations 302, 304, 306, 308, 310, and 312.

At operation 302 the user input module 202 receives a user input that defines or otherwise specifies criteria from a client device 102. For example, the user input may define specific criteria or preferences for a search of data objects within a database.

In some examples, the criteria may be defined through user inputs received via a GUI presented on the client device 102. For example, the GUI can include various elements that allow users to input their preferences efficiently and accurately. For instance, the GUI might feature dropdown menus that enable users to select from predefined options, such as service types, geographical locations, or availability. In some examples, text input fields may be provided for users to enter specific information.

In some examples, radio button selections can be used for binary or categorical criteria, allowing users to quickly choose between a small set of options, such as yes/no decisions or selecting among a few predefined categories.

Other interactive elements such as checkboxes, sliders, or toggle switches may also be incorporated into the GUI. For example, checkboxes allow users to select multiple options from a set, which is useful for criteria that can accept multiple values, such as selecting various amenities or services desired in a healthcare facility. Sliders and toggle switches provide dynamic control over a range, such as defining a radius for location-based searches or adjusting levels of importance for various attributes.

At operation 304, the filtering module 204 identifies a subset of search results from within the database 120 based on the defined user criteria. This operation effectively filters out irrelevant data, focusing only on results that meet the user's needs.

At operation 306, the threshold module 206 evaluates a quantity of the identified subset of search results against a threshold value. In some examples, this threshold may be dynamically adjusted based on factors such as the total number of available results, historical data, and other contextual information. In some examples, the threshold module 206 may apply statistical models to determine whether the quantity of results is sufficient to proceed.

At operation 308 the referral request module 208 generates a referral request based on the specified user criteria and the subset of search results. In some examples, the construction of the referral request may be based on one or more templatized forms, which are predefined templates that standardize the format and content of the information being transmitted. Each templatized form is specifically designed to correspond with each search result among the set of search results, ensuring that the information is presented in a manner that is both recognizable and actionable by the recipient. This standardization helps in maintaining consistency, reducing errors, and improving the efficiency of the referral process.

For example, if the search results include different types of service providers, each type might have a distinct templatized form that highlights the most relevant information for that provider type, based on requirements specified by each of the providers. As an illustrative example, for a healthcare provider, the form might focus on medical specialties, availability, and insurance compatibility, while a legal service provider form might emphasize areas of practice, case types, and consultation availability.

Furthermore, these templatized forms can include various fields that are automatically populated with data extracted from the user criteria and if applicable, a user profile or user attributes associated with the user of the client device 102. Fields such as service type, location, user preferences, and any specific requirements or notes that the user has entered can be included. This automation ensures that each referral request is both comprehensive and tailored to the specific context of the search result it corresponds to.

At operation 310, the automated referral system 116 authenticates the user of the client device 102 to ensure the security and integrity of the transaction. This operation might involve methods such as two-factor authentication or digital certificates to verify the user's identity before proceeding with the referral.

At operation 312 two concurrent actions are performed by the system responsive to authenticating the user in operation 310. The automated referral system 116 causes the display of the subset of search results on the client device 102, which allows the user to review the selections, while simultaneously transmitting the one or more referral requests to one or more recipients corresponding with each search result among the subset of search results.

Figure 4:
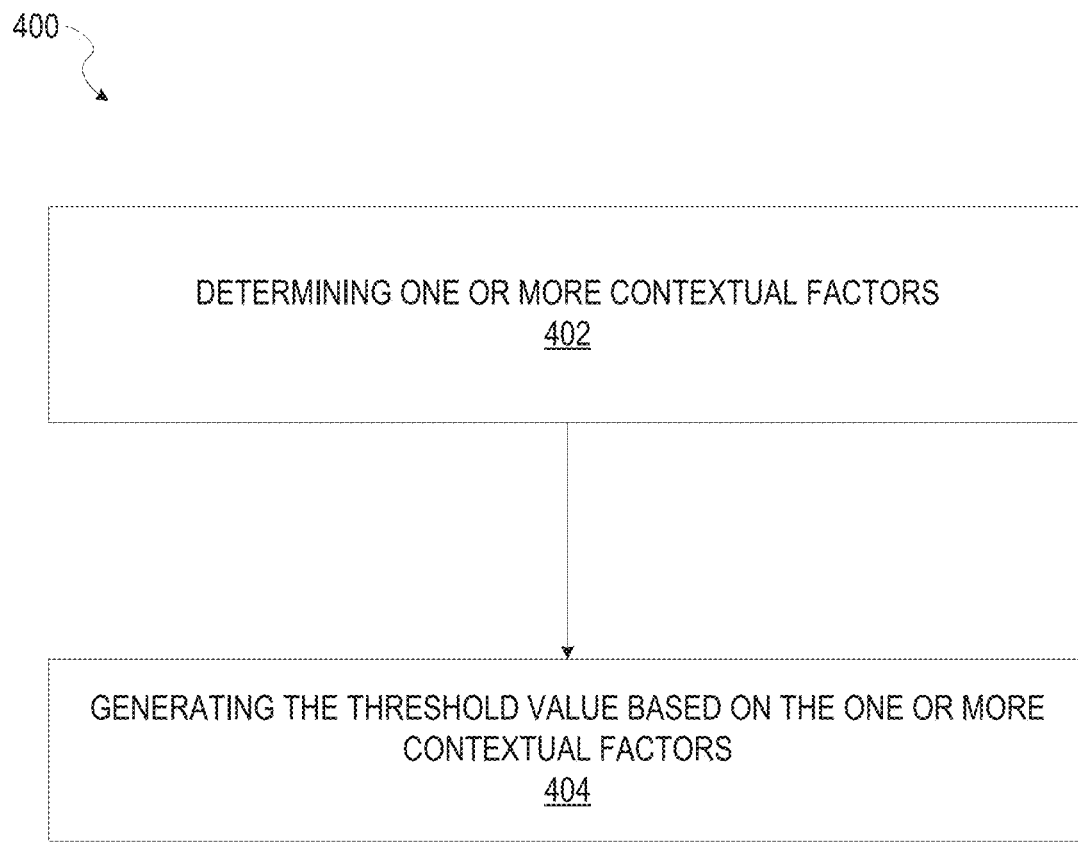
FIG. 4 is a flowchart depicting a method illustrating various operations of the automated referral system in determining a threshold value, according to certain examples.

FIG. 4 is a flowchart depicting a method 400 illustrating various operations of the automated referral system 116 in determining a threshold value, according to certain examples. Operations of the method 400 may be performed by the modules described above with respect to FIG. 2. The method 400 may be performed as part (e.g., a precursor task, a subroutine, or a portion) of operation 306 of the method 300, according to certain example embodiments. As seen in FIG. 4, the method 400 may comprise one or more operations that include operations 402 and 404.

At operation 402, the threshold module 206 identifies and analyzes various contextual factors to determine and apply a dynamic threshold value. For example, the contextual factors may include, but are not limited to, the total number of available search results, historical data regarding user interactions and outcomes, time of day, user location, and specific user preferences.

In some examples, the threshold module 206 may access data from the databases 120 that store historical interaction logs and outcomes to understand trends and patterns. For instance, if historical data indicate that searches performed during certain times or in specific locations yield higher quality results, the module might adjust the threshold values accordingly.

In some examples, real-time data such as the current load on the system or the geographic distribution of service providers could also be considered as contextual factors.

At operation 404 the threshold module 206 generates (or adjusts) the threshold value based on the analyzed contextual data. For example, the threshold module 206 may apply a predictive model that inputs the contextual factors and outputs a threshold value that optimizes the balance between the breadth and relevance of the search results. For example, if the module recognizes a high volume of available results and historical success in certain criteria, it might set a higher threshold to narrow down the results to the most relevant ones.

Alternatively, the threshold module 206 may apply a rule-based approach where certain contextual factors trigger predefined adjustments to the threshold value. For instance, a lower number of total available results might automatically lower the threshold to broaden the search criteria and avoid overly restrictive filtering.

FIG. 5 is a flowchart depicting a method 500 illustrating various operations of the automated referral system 116 in determining a subset of a set of search results, according to certain examples. Operations of the method 500 may be performed by the modules described above with respect to FIG. 2. The method 500 may be performed as part (e.g., a precursor task, a subroutine, or a portion) of operation 306 of the method 300, according to certain example embodiments. As seen in FIG. 5, the method 500 may comprise one or more operations that include operations 502, 504, and 506.

At operation 502, the user input module 202 initiates a request for additional user input based on the comparison of the quantity against the threshold value as in operation 306 of the method 300. This operation is designed to refine the search process by incorporating more specific user-defined criteria.

In some examples, the system may dynamically generate a user interface element, such as a popup or a new section on the existing interface, which prompts the user to specify additional criteria. This could be triggered if the initial search results are too broad or do not meet quality thresholds, indicating the need for more precise filtering. The interface might suggest specific criteria based on the initial results or user profile, such as asking for a narrower geographical range, specific service features, or specific user attributes.

At operation 504 the user input module 202 receives a second user input that defines the additional criteria. In some examples, the system receives the second set of criteria through various interactive elements such as dropdown menus, checkboxes, or text fields.

At operation 506, the filtering module 204 processes the combined criteria from the initial and second user inputs to filter the search results more precisely. This operation uses both sets of criteria to perform a more targeted search within the database, aiming to produce a subset of results that closely match the user's refined preferences.

Figure 6:
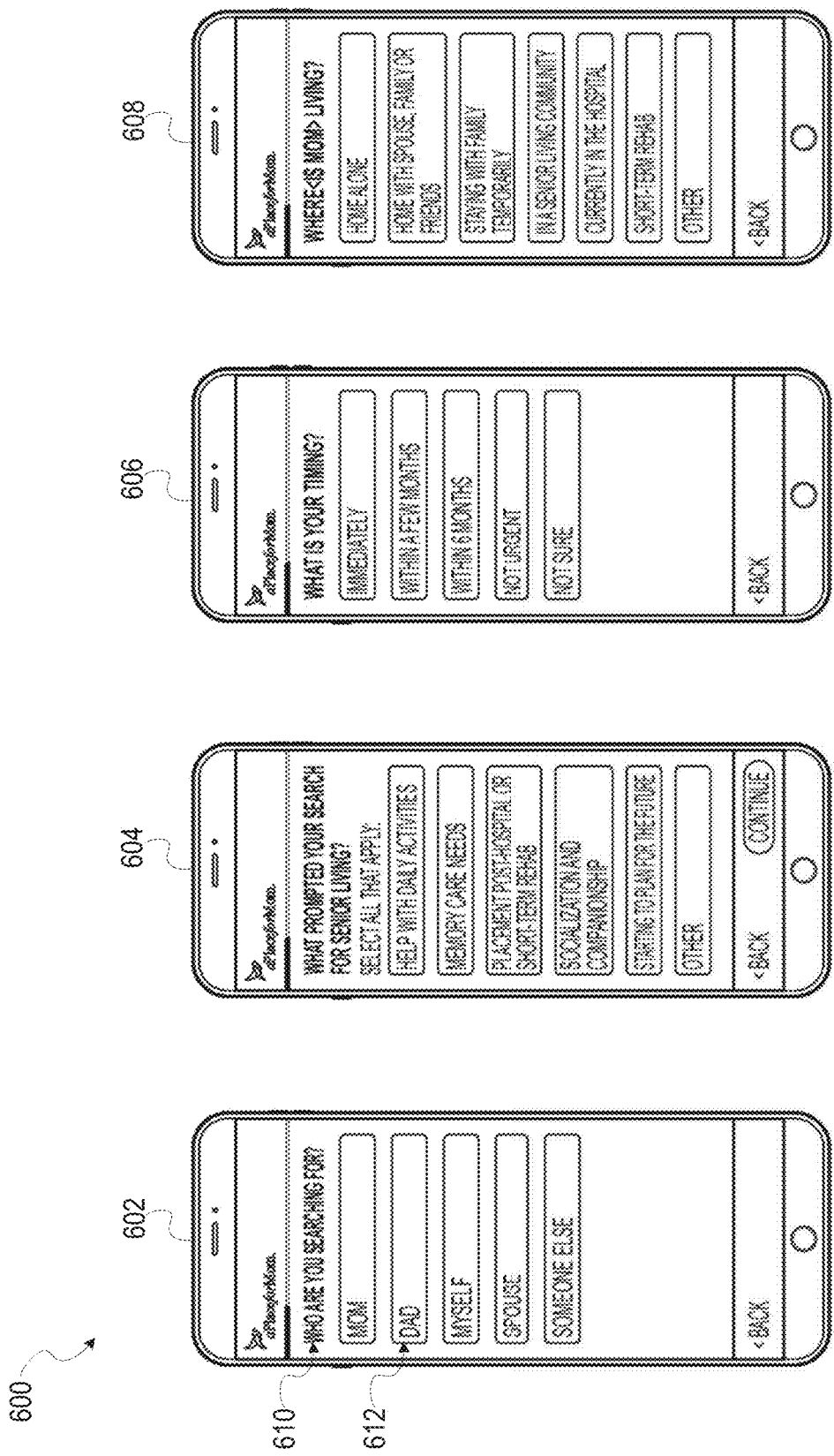
FIG. 6 is an interface flow diagram illustrating representative interfaces generated by an automated referral system for display at a client device, according to certain examples.

FIG. 6 is an interface flow diagram 600 illustrating representative interfaces generated by an automated referral system 116 for display at a client device 102, according to certain examples. As seen in the interface flow diagram 600, the automated referral system 116 may generate and display the GUIs 602, 604, 606, and 608 at a client device, such as a client device 102.

According to certain examples, the interfaces are designed to sequentially gather user-defined criteria for processing and refining search results for service referrals. Accordingly, each interface in the sequence may be contextually linked, with subsequent interfaces being influenced by the responses provided in preceding ones, thereby creating a tailored interaction flow that adapts to user inputs in real-time. For example, following the initial input at GUI 602, the GUI 604 may be generated to request more detailed criteria based on the user's previous inputs. The GUI 604 may in some examples include more granular control elements such as sliders for defining budget ranges, checkboxes for selecting specific service features, or radio buttons for binary choices like "yes/no" questions regarding service preferences.

In some examples, the GUI 602 may serve as an entry point for user interaction, where a user of a client device 102 may be provided a request for initial criteria. In some examples, the request comprises one or more interface elements to facilitate user input from the user of the client device 102. For example, as seen in the interface flow diagram 600 the GUIs 602, 604, 606, and 608 each includes a request prompt 610, and a set of radio buttons 612 to receive user selection.

In some examples, the interfaces may include one or more adaptive UI elements that change based on the type of service the user selects. For example, selecting "assisted living" might dynamically generate or add additional fields or selectable icons related to different types of care providers or specialists.

Responsive to receiving inputs that specify criteria via a GUI, such as the GUI 602, 604, 606, or 608, the system immediately processes this information to filter a set of available search results from within the database. After each input received, the system filters a set of available search results based on the received inputs and evaluates the filtered set (or subset) of search results against a threshold value, which includes a confidence measure assessing the quality and relevance of the results based on the user's specified criteria.

The threshold value may be predefined, dynamically adjusted, or specifically tailored based on classifications assigned to the user, wherein the classifications are derived from the criteria specified by the user, such as the type of care needed. For example, if the quantity of results is too few (i.e., less than the threshold value), indicating that the criteria might be too restrictive or too broad, the system may generate further requests for criteria for the user.

In some examples, the threshold value may be predefined and static, set based on historical data or standard operational requirements of the system. For example, a general threshold might be set to ensure that at least ten options are always presented to the user to provide a reasonable variety of choices.

In some examples, the threshold value may be dynamic, such that it is adjusted (i.e., increased or decreased) in real-time based on various factors including but not limited to the total number of available results in the database, the specificity of the user's input, or the current demand and supply dynamics within the service network.

In some examples, the threshold value may be linked to the classifications assigned to the user based on their specified criteria. This approach allows the system to apply different threshold values for different types of needs, enhancing the personalization of the service.

After each input received, the system filters a set of available search results based on the received inputs and evaluates the filtered set (or subset) of search results against a threshold, which includes a confidence measure assessing the quality and relevance of the results based on the user's specified criteria.

Figure 7:
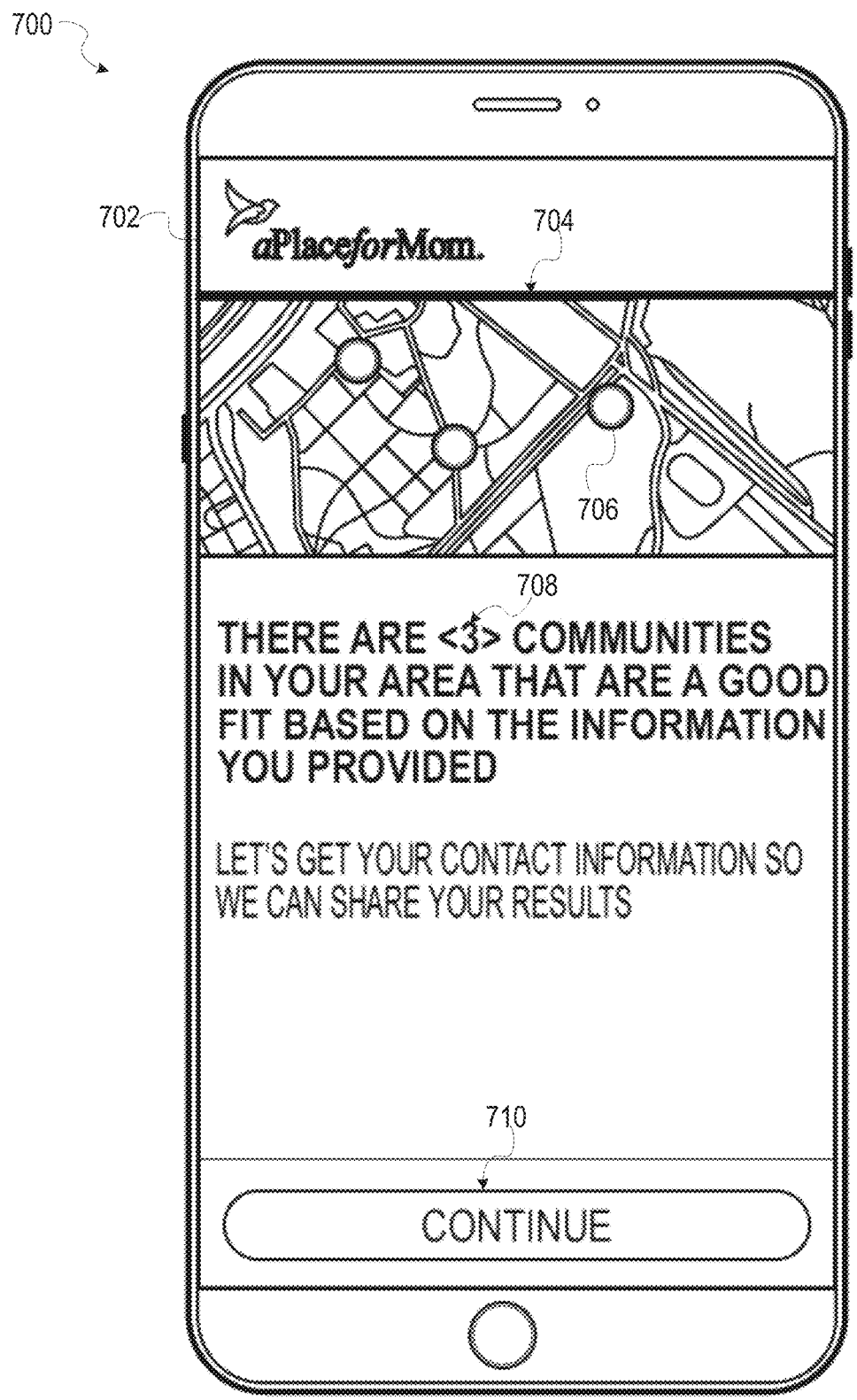
FIG. 7 is an interface diagram illustrating a representative interface generated by an automated referral system for display at a client device, according to certain examples.

FIG. 7 is an interface diagram 700 illustrating a representative interface 702 generated by an automated referral system 116 for display at a client device 102, according to certain examples. As seen in the interface diagram 700, the interface 702 comprises a display of a map image 704 that includes one or more graphical icons, such as the graphical icon 706, a quantity value 708 that indicates the total number of search results among the identified search results, and a graphical element to receive user input, such as the icon 710.

Upon determining that a number of search results is adequate and the confidence level is satisfactory as in operation 306 of the method 300, the system ceases further criteria requests and automatically transitions to presenting the GUI 702, as depicted in interface diagram 700 of FIG. 7. This interface displays the total number of search results available for review, indicating to the user that the results are ready and tailored based on their inputs.

According to certain examples, the interface 702 includes the map image 704, which provides a geographical representation of a search area. The map image 704 displays the locations of the search results through the graphical icons 706. In some examples, attributes of the graphical icons 706 may reflect the type of service or product offered, enhancing user understanding at a glance. Users can interact with the map by zooming and panning, allowing them to explore different areas or focus on specific locations.

In some examples, adjacent to or integrated within the map is the display of the quantity of search results 708, which informs the user of the total number of matches found based on their search criteria.

In some examples, clicking or tapping an icon from among the graphical icons 706 may cause the system to present more detailed information about each location, such as the name of the facility, services offered, and contact details.

In some examples, a user may provide an input to select the icon 710 in order to access and view the identifies search results. Accordingly, responsive to receiving a selection of the icon 710, the user may be prompted to undergo a series of security checks to authenticate their identity, as depicted in the interface diagram 800 depicted in FIG. 8. For example, the authentication methods employed can vary based on the system's security requirements and the nature of the information being accessed. Common methods include entering a pre-set password, biometric verification such as fingerprint scans or facial recognition for systems equipped with such technology, and two-factor authentication (2FA).

Figure 8:
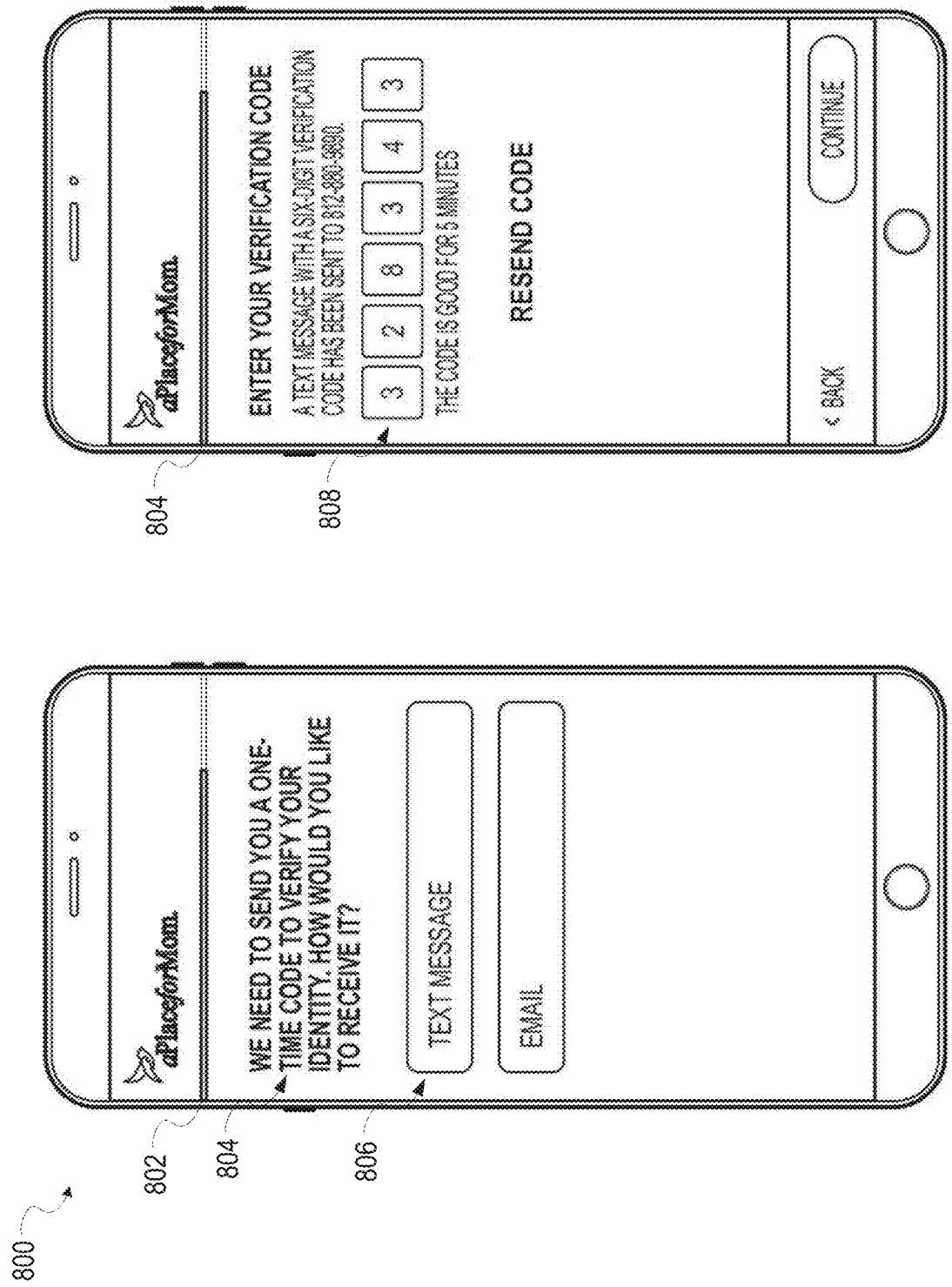
FIG. 8 is an interface flow diagram illustrating representative interfaces which may be generated by an automated referral system for display at a client device, according to certain examples.

FIG. 8 is an interface flow diagram 800 illustrating a representative interface 702 generated by an automated referral system 116 for display at a client device 102, according to certain examples. As seen in the interface flow diagram 800, the interface 802 comprises a display of an authentication request 804 that comprises one or more graphical icons 806. Responsive to receiving an input that selects a graphical icon from among the one or more graphical icons 806, the system may cause display of the interface 804, wherein the interface 804 includes one or more fields 808 to input authentication credentials in order to authenticate the user of the client device.

Figure 9:
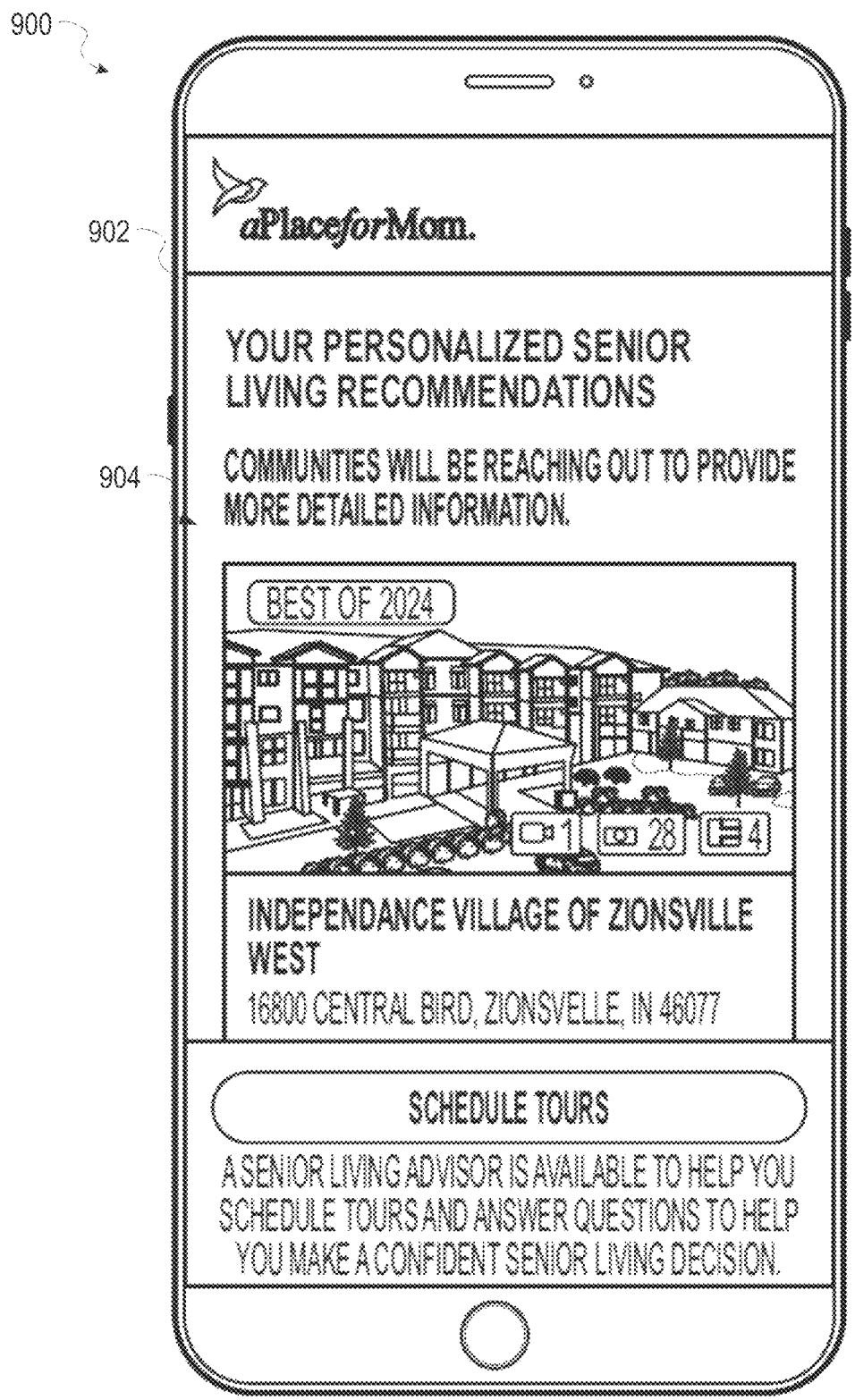
FIG. 9 is an interface diagram illustrating a representative interface, which may be generated by an automated referral system for display at a client device, according to certain examples.
Figure 10:
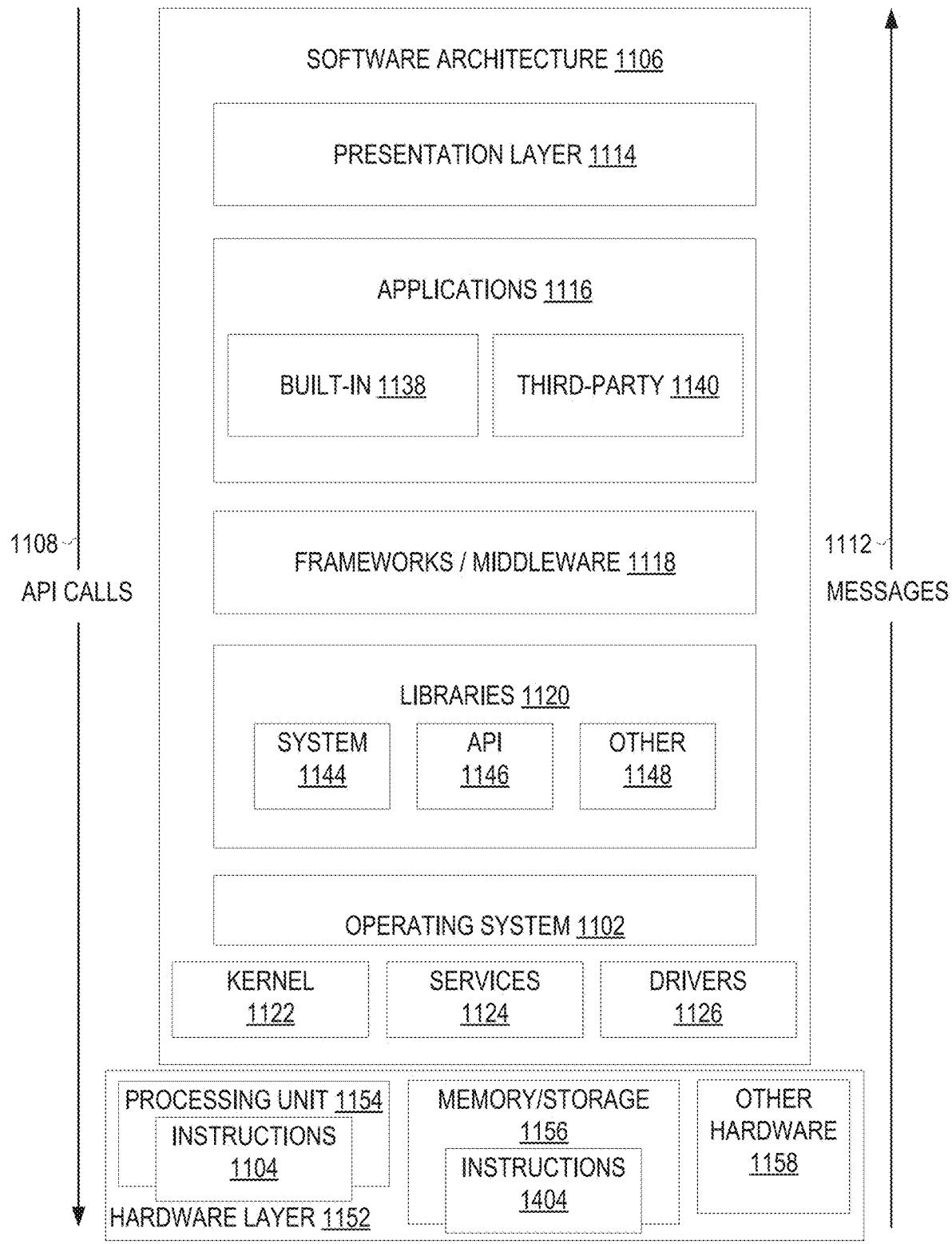
FIG. 10 is a block diagram illustrating a representative software architecture, which may be used in conjunction with various hardware architectures herein described and used to implement various embodiments.

Responsive to authenticating the user, the system may transition to the interface 902 depicted in the interface diagram 900 of FIG. 9, wherein the system simultaneously performs operations to transmit a generated referral request to one or more recipients associated with the set of identified search results, while presenting the set of identified search results at the client device.

FIG. 9 is an interface diagram 900 illustrating a representative interface 902 generated by an automated referral system 116 for display at a client device 102, according to certain examples.

In some examples, the search results 904 can be presented in a feed format, but other formats such as thumbnails, a list, or even a grid can also be utilized depending on user preference or the specific requirements of the data being displayed.

Once a user of the client device is authenticated as in operation 310 of the method 300, interface 902 is presented by the automated referral system 116. This authentication ensures that sensitive data or personalized search results are securely accessed by verified users only. Subsequent to this authentication, the system simultaneously transmits a referral request to recipients corresponding with each of the search results as in operation 312 of the method 300. In some examples, transmitting the referral request may include accessing a database (e.g., the database 12) that contains detailed recipient information associated with each search result. The system identifies the appropriate recipients based on the search results and transmits the referral request accordingly. The referral request may include user details and attributes provided by the user, as well as one or more criteria defined by the user.

Software Architecture

Figure 11:
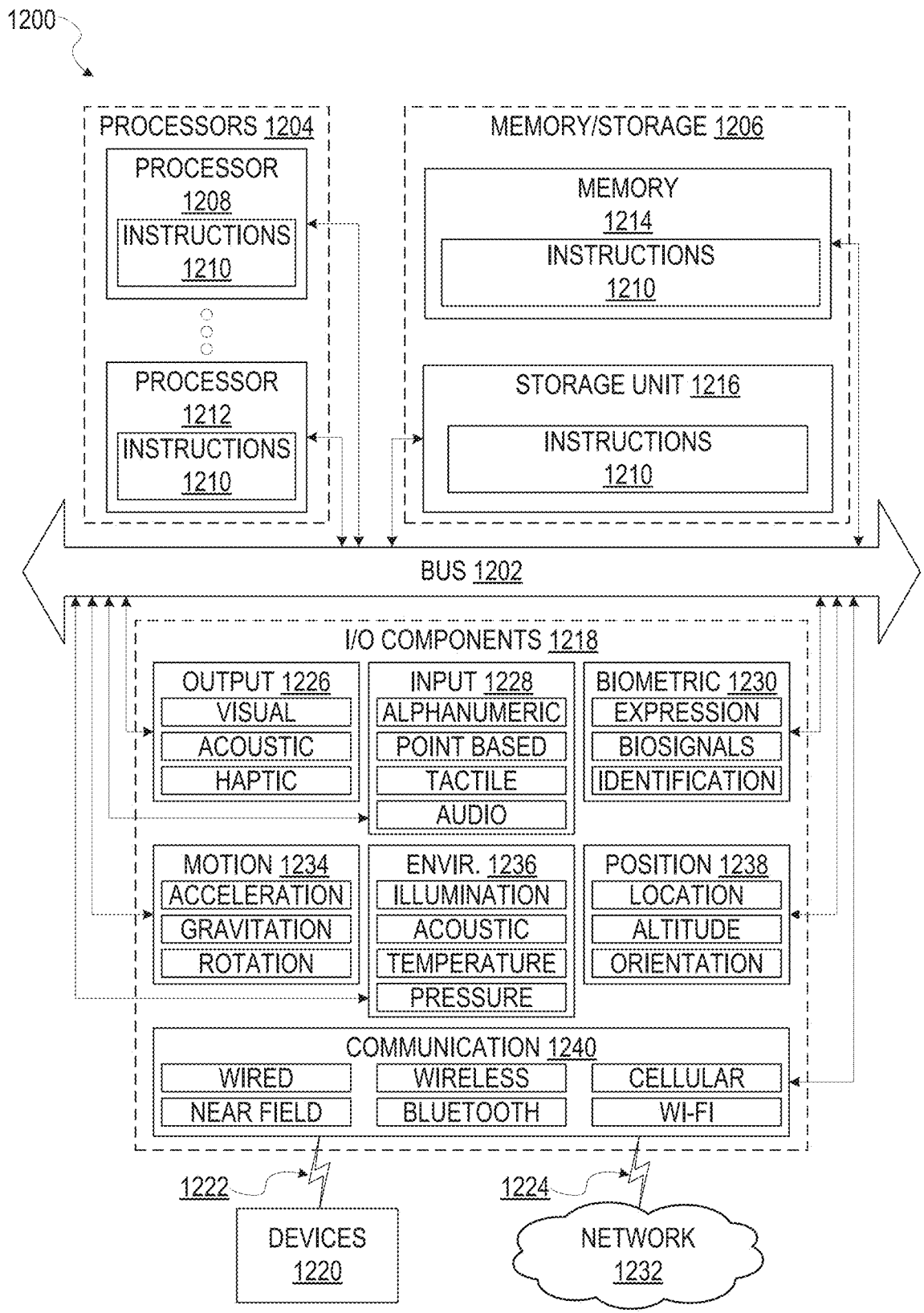
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1100 of FIG. 11 that includes, among other things, processors 1104, memory 1114, and I/O components 1118. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:
   a memory; and
   at least one hardware processor coupled to the memory and comprising instructions that causes the system to perform operations comprising:
   receiving, from a client device, a user input that defines a user criteria;
   filtering a set of search results from within a database based on the user criteria to identify a subset of the set of search results, the subset of the set of search results comprising a quantity of search results;
   performing a comparison of the quantity of search results against a threshold value;
   generating a referral request based on at least the user criteria and the subset of the set of search results responsive to the comparison of the quantity of search results against the threshold value;
   authenticating a user of the client device based on the referral request; and
   simultaneously performing operations comprising:
      causing display of a presentation of the subset of search results at the client device; and
      transmitting the referral request to one or more recipients corresponding with the subset of the set of search results.

2. The system of claim 1, wherein the authenticating the user of the client device based on the referral request includes:
   performing two-factor authentication to authenticate the user of the client device.

3. The system of claim 1, wherein the user criteria include one or more of:
   location data;
   a budgetary constraint; and
   a type of service.

4. The system of claim 1, wherein the threshold value includes a dynamic threshold value, and wherein the operations further comprise:
   determining one or more contextual factors; and
   adjusting the dynamic threshold value based on the one or more contextual factors.

5. The system of claim 4, wherein the one or more contextual factors are based on the user criteria defined by the user input.

6. The system of claim 1, wherein the presentation of the subset of search results comprises a map image that includes one or more graphical icons at positions within the map image, wherein the one or more graphical icons correspond with the subset of search results.

7. The system of claim 1, wherein the transmitting the referral request to the one or more recipients corresponding with the subset of the set of search results further comprises encrypting the referral request.

8. The system of claim 1, wherein the user input that defines the user criteria is a first user input that defines a first user criteria, and wherein the operations further comprise:
   causing display of a request to define a second user criteria based on the comparison of the quantity of search results against the threshold value and the first user input that defines the first user criteria;
   receiving a second user input that defines the second user criteria; and
   filtering the set of search results within the database based on the first user criteria and the second user criteria.

9. A method comprising:
   receiving, from a client device, a user input that defines a user criteria;
   filtering a set of search results from within a database based on the user criteria to identify a subset of the set of search results, the subset of the set of search results comprising a quantity of search results;
   performing a comparison of the quantity of search results against a threshold value;
   generating a referral request based on at least the user criteria and the subset of the set of search results responsive to the comparison of the quantity of search results against the threshold value;
   authenticating a user of the client device based on the referral request; and
   simultaneously performing operations comprising:
      causing display of a presentation of the subset of search results at the client device; and
      transmitting the referral request to one or more recipients corresponding with the subset of the set of search results.

10. The method of claim 9, wherein the authenticating the user of the client device based on the referral request includes:
    performing two-factor authentication to authenticate the user of the client device.

11. The method of claim 9, wherein the user criteria include one or more of:
    location data;
    a budgetary constraint; and
    a type of service.

12. The method of claim 9, wherein the threshold value includes a dynamic threshold value, and wherein the operations further comprise:
    determining one or more contextual factors; and
    adjusting the dynamic threshold value based on the one or more contextual factors.

13. The method of claim 12, wherein the one or more contextual factors are based on the user criteria defined by the user input.

14. The method of claim 9, wherein the presentation of the subset of search results comprises a map image that includes one or more graphical icons at positions within the map image, wherein the one or more graphical icons correspond with the subset of search results.

15. The method of claim 9, wherein the transmitting the referral request to the one or more recipients corresponding with the subset of the set of search results further comprises encrypting the referral request.

16. The method of claim 9, wherein the user input that defines the user criteria is a first user input that defines a first user criteria, and wherein the operations further comprise:
    causing display of a request to define a second user criteria based on the comparison of the quantity of search results against the threshold value and the first user input that defines the first user criteria;
    receiving a second user input that defines the second user criteria; and
    filtering the set of search results within the database based on the first user criteria and the second user criteria.

17. A non-transitory machine-readable storage medium comprising instructions that, when executed by one or more processors of a machine, cause the machine to perform operations comprising:
    receiving, from a client device, a user input that defines a user criteria;
    filtering a set of search results from within a database based on the user criteria to identify a subset of the set of search results, the subset of the set of search results comprising a quantity of search results;
    performing a comparison of the quantity of search results against a threshold value;
    generating a referral request based on at least the user criteria and the subset of the set of search results responsive to the comparison of the quantity of search results against the threshold value;
    authenticating a user of the client device based on the referral request; and
    simultaneously performing operations comprising:
        causing display of a presentation of the subset of search results at the client device; and
        transmitting the referral request to one or more recipients corresponding with the subset of the set of search results.

18. The non-transitory machine-readable storage medium of claim 17, wherein the authenticating the user of the client device based on the referral request includes:
    performing two-factor authentication to authenticate the user of the client device.

19. The non-transitory machine-readable storage medium of claim 17, wherein the user criteria include one or more of:
    location data;
    a budgetary constraint; and
    a type of service.

20. The non-transitory machine-readable storage medium of claim 17, wherein the threshold value includes a dynamic threshold value, and wherein the operations further comprise:
    determining one or more contextual factors; and
    adjusting the dynamic threshold value based on the one or more contextual factors.

* * * * *